(12) United States Patent
Amemiya

(10) Patent No.: US 9,987,895 B2
(45) Date of Patent: Jun. 5, 2018

(54) SUSPENSION TOWER

(71) Applicant: TOYOTA JIDOSHA KABUSHIKI KAISHA, Toyota-shi, Aichi-ken (JP)

(72) Inventor: Koji Amemiya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/108,619

(22) PCT Filed: Jan. 5, 2015

(86) PCT No.: PCT/JP2015/050035
§ 371 (c)(1),
(2) Date: Jun. 28, 2016

(87) PCT Pub. No.: WO2015/122202
PCT Pub. Date: Aug. 20, 2015

(65) Prior Publication Data
US 2016/0355064 A1    Dec. 8, 2016

(30) Foreign Application Priority Data

Feb. 12, 2014  (JP) ................................ 2014-024387

(51) Int. Cl.
*B60G 3/00*   (2006.01)
*B62D 25/08*  (2006.01)
*B62D 29/00*  (2006.01)

(52) U.S. Cl.
CPC ............... *B60G 3/00* (2013.01); *B62D 25/08* (2013.01); *B62D 25/088* (2013.01); *B62D 29/008* (2013.01)

(58) Field of Classification Search
CPC ........ B60G 3/00; B62D 25/08; B62D 25/088; B62D 29/008
See application file for complete search history.

(56) References Cited

U.S. PATENT DOCUMENTS 5,456,517 A * 10/1995 Kalian ................. B60G 15/068
                                                      164/47
6,547,281 B1 * 4/2003 Iwatsuki ................. B60G 11/16
                                                      280/781
(Continued)

FOREIGN PATENT DOCUMENTS

DE    102011109466 A1    3/2012
DE    102012015149 A1    2/2014
(Continued)

OTHER PUBLICATIONS

Feb. 6, 2017 extended European Search Report issued in Application No. 15748747.1.

*Primary Examiner* — Paul N Dickson
*Assistant Examiner* — Timothy Wilhelm
(74) *Attorney, Agent, or Firm* — Oliff PLC

(57) ABSTRACT

A suspension tower has: a top plate at which an upper end side of a front suspension is fixed at a fixing portion that is disposed apart from a stroke axis of the suspension; and a gradually changing rib that is provided upright from the top plate and extends from the stroke axis side toward an outer peripheral side at the top plate. The gradually changing rib has a constant level portion whose height from the fixing portion is constant, and a gradually changing portion whose height from the fixing portion is gradually decreased from the constant level portion toward the outer peripheral side. A boundary between the constant level portion and the gradually changing portion is disposed adjacent to the fixing portion.

7 Claims, 7 Drawing Sheets

(56) References Cited

U.S. PATENT DOCUMENTS

| | | | | |
|---|---|---|---|---|
| 7,770,964 | B2* | 8/2010 | Herntier | B62D 25/088 |
| | | | | 280/124.109 |
| 9,233,719 | B2* | 1/2016 | Shibata | B62D 25/082 |
| 9,469,345 | B2* | 10/2016 | Amemiya | B62D 21/11 |
| 9,517,796 | B2* | 12/2016 | Balzer | B62D 21/11 |
| 9,517,798 | B2* | 12/2016 | Matsuo | B62D 21/15 |
| 2012/0169023 | A1* | 7/2012 | Rawlinson | B60G 15/067 |
| | | | | 280/124.155 |
| 2013/0134742 | A1* | 5/2013 | Mildner | B62D 25/088 |
| | | | | 296/203.02 |
| 2013/0221708 | A1* | 8/2013 | Hanakawa | B62D 25/088 |
| | | | | 296/193.09 |
| 2015/0314811 | A1 | 11/2015 | Shibata et al. | |
| 2016/0129946 | A1* | 5/2016 | Drewes | B21K 23/00 |
| | | | | 296/193.01 |

FOREIGN PATENT DOCUMENTS

| | | |
|---|---|---|
| EP | 1 138 581 A2 | 10/2001 |
| EP | 1880784 A2 | 1/2008 |
| JP | 2003137132 A | 5/2003 |
| JP | 5918391 B2 | 5/2016 |
| WO | 2007/019935 A1 | 2/2007 |

\* cited by examiner

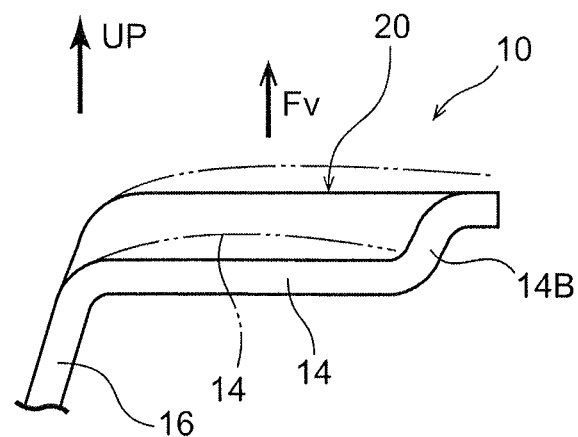
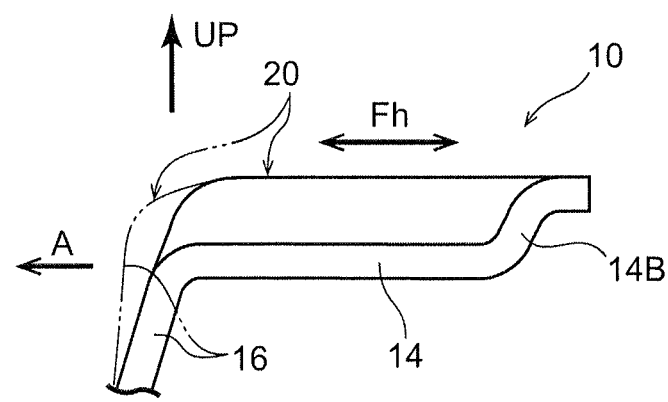

SUSPENSION TOWER

TECHNICAL FIELD

The present disclosure relates to a suspension tower.

BACKGROUND ART

A structure is known in which plural ribs are formed in a radial form at a plate that forms the upper end of a cast suspension tower (see, for example, International Publication No. 2007/019935).

SUMMARY OF INVENTION

Technical Problem

However, there is room for further improvement in order to improve the rigidity of the suspension tower.

An object of the present disclosure is to obtain a suspension tower that can improve rigidity while suppressing an increase in mass or an increase in dimensions.

Solution to Problem

A suspension tower relating to a first aspect comprises: a plate at which an upper end side of a suspension is fixed at a fixing portion that is disposed apart from an axis of the suspension; and a gradually changing rib that is provided upright from the plate and extends from an axis side toward an outer peripheral side at the plate, and that has a constant level portion whose height from the fixing portion is constant, and a gradually changing portion whose height from the fixing portion gradually decreases from the constant level portion toward the outer peripheral side, and a boundary between the constant level portion and the gradually changing portion is adjacent to the fixing portion.

In this suspension tower, the rigidity of the plate improves due to the gradually changing rib. Here, at the gradually changing rib, the boundary between the constant level portion and the gradually changing portion is disposed adjacent to the fixing portion (the application range of the fixing load). Therefore, when load in the vertical direction is inputted from the fixing portion, a concentration of stress on the portion in the vicinity of the fixing portion at the gradually changing rib is mitigated. Therefore, the rigidity of the suspension tower can be improved by the gradually changing rib, without relying on the height or the thickness of the rib.

In this way, in the suspension tower of the first aspect, rigidity can be improved while an increase in mass or an increase in dimensions is suppressed.

In the above-described aspect, there may be a structure in which, at the fixing portion, the upper end side of the suspension is fixed by a fastening load from a fastener, the fastening load being applied around a fastening hole formed in the plate, and the boundary between the constant level portion and the gradually changing portion is disposed between a position, at the gradually changing rib, which is a shortest distance from an edge portion of the fastening hole, that is furthest toward an outer peripheral side of the fastening hole, and a position, at the gradually changing rib, which is a shortest distance from a portion of an application range of the fastening load, that is furthest toward an outer peripheral side of the application range of the fastening load.

In this suspension tower, the starting point of the gradually changing portion at the gradually changing rib is made to be at the outer side of the fixing hole at the application range of the fastening load. Therefore, a concentration of stress on the portion in the vicinity of the fixing portion at the gradually changing rib is mitigated more effectively.

In the above-described aspect, there may be a structure in which a plurality of ribs are provided upright at the plate in a radial form around the axis of the suspension, and, among the plurality of ribs, at least one of two ribs, that are disposed so as to sandwich the fixing portion in the peripheral direction, is the gradually changing rib.

In this suspension tower, the rigidity of the plate improves due to the plural ribs that form a radial form. Among these ribs, a rib that is adjacent to the fixing portion is the gradually changing rib, and therefore, the rigidity of the plate can be improved effectively by this gradually changing rib.

The above-described aspect may be structured so as to comprise: a tower main body that has a peripheral wall to whose upper end the plate is fixed, and that accommodates the suspension within the peripheral wall; and an inner rib that, within the peripheral wall, bridges facing walls that structure the peripheral wall, wherein an end portion at a side far from the axis of the suspension, or an intermediate portion of at least some of the ribs, is positioned on the inner rib.

In this suspension tower, the vertical bending rigidity of at least some of the ribs is improved (reinforced) by the inner rib. Due thereto, the rigidity of the suspension tower can be improved by the rib, without relying on the height or the thickness of the rib.

The above-described aspect may be structured so as to comprise: a tower main body that has a peripheral wall to whose upper end the plate is fixed, and that accommodates the suspension within the peripheral wall, wherein an end portion at a side far from the axis of the suspension, or an intermediate portion of at least some of the ribs, is positioned on a ridgeline of the plate and the peripheral wall.

In this suspension tower, the vertical bending rigidity of some of the ribs is improved (reinforced) by the peripheral wall. Due thereto, the rigidity of the suspension tower can be improved by the rib, without relying on the height or the thickness of the rib.

In the above-described aspect, there may be a structure in which the end portion at the side far from the axis of some of the ribs is positioned on a ridgeline of the plate and, of the peripheral wall, a front wall or a rear wall that faces in a vehicle longitudinal direction.

In this suspension tower, the rigidity in the vehicle longitudinal direction improves on the whole due to the rib reaching the ridgeline of the plate and the front wall or the rear wall.

A suspension tower of another aspect of the present disclosure comprises: a plate at which an upper end side of a suspension is fixed at a fixing portion that is disposed apart from an axis of the suspension; a tower main body that has a peripheral wall to whose upper end the plate is fixed, and that accommodates the suspension within the peripheral wall; an inner rib that, within the peripheral wall, bridges facing walls that structure the peripheral wall; and a plurality of ribs that are provided upright from the plate in a radial form around the axis, and an end portion at a side far from the axis or an intermediate portion of at least some of the plurality of ribs, is positioned on the inner rib.

In this suspension tower, the rigidity of the plate is improved by the plural ribs that form a radial form. The vertical bending rigidity of at least some of the ribs among these plural ribs improves (is reinforced) by the inner rib.

Due thereto, the rigidity of the suspension tower can be improved by the ribs, without relying on the height or the thickness of the ribs. This suspension tower may be structured to have the tower main body that has a peripheral wall to whose upper end the plate is fixed, and that accommodates the suspension within the peripheral wall, and such that an end portion at a side far from the axis or an intermediate portion of at least some of the ribs is positioned on a ridgeline of the plate and the peripheral wall. In this suspension tower, the vertical bending rigidity of some of the ribs improves (is reinforced) by the peripheral wall. Due thereto, the rigidity of the suspension tower can be improved by the ribs, without relying on the height or the thickness of the ribs. Further, this suspension tower may be structured such that an end portion at a side far from the axis of some of the ribs is positioned on a ridgeline of the plate and, of the peripheral wall, a front wall or a rear wall that faces in the vehicle longitudinal direction. In this suspension tower, the rigidity in the vehicle longitudinal direction improves on the whole due to the ribs reaching the ridgeline of the plate and the front wall or the rear wall.

Advantageous Effects of Invention

As described above, the suspension tower relating to the present disclosure has the excellent effect of being able to improve rigidity while suppressing an increase in mass or an increase in dimensions.

BRIEF DESCRIPTION OF DRAWINGS

FIG. 6A is a drawing that schematically shows a deformation mode of the suspension tower relating to the present embodiment, and is a schematic drawing showing bending deformation in a vertical direction.

FIG. 6B is a drawing that schematically shows a deformation mode of the suspension tower relating to the present embodiment, and is a schematic drawing showing falling deformation in a longitudinal or a vehicle transverse direction.

DESCRIPTION OF EMBODIMENTS

A suspension tower 10 relating to an embodiment of the present disclosure is described on the basis of FIG. 1 through FIG. 6. Note that arrow FR, arrow UP, and arrow CL that are shown appropriately in the respective drawings respectively indicate the forward direction, the upward direction, and the inner side in the vehicle transverse direction of an automobile to which the suspension tower 10 is applied. Hereinafter, when description is given by using merely the longitudinal and vertical directions, they mean the longitudinal of the vehicle longitudinal direction and the vertical of the vehicle vertical direction, unless otherwise stated. Further, because the suspension tower 10 is structured so as to basically have left-right symmetry with respect to a vehicle transverse direction central line, the suspension tower 10 at the right side, that is one side in the vehicle transverse direction, is mainly explained in the following description.

[Schematic Structure of Suspension Tower]

(Overall Structure)

Figure 1:
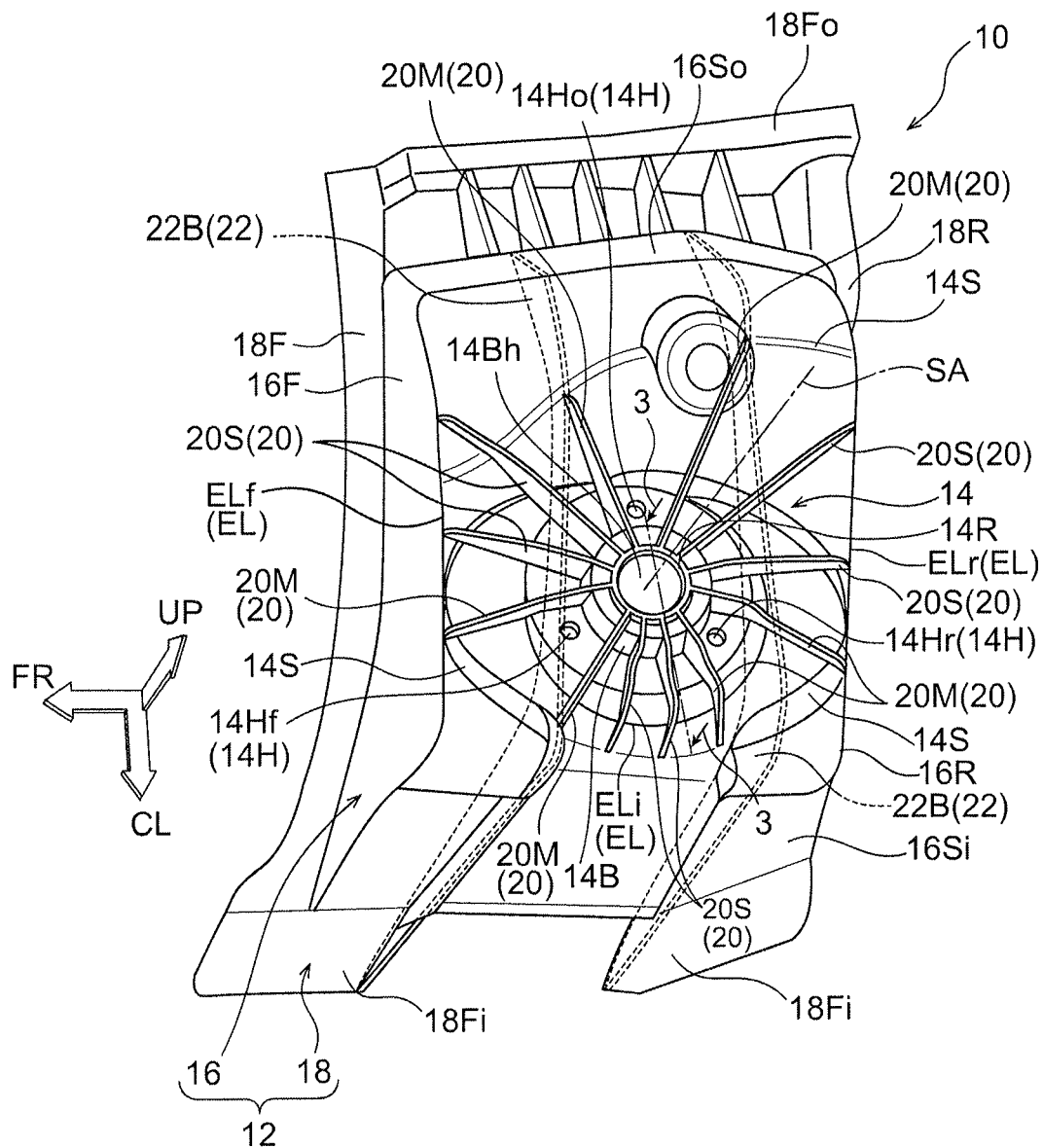
FIG. 1 is a perspective view in which the schematic structure of a suspension tower relating to a present embodiment is viewed obliquely from the front and from above.
Figure 2:
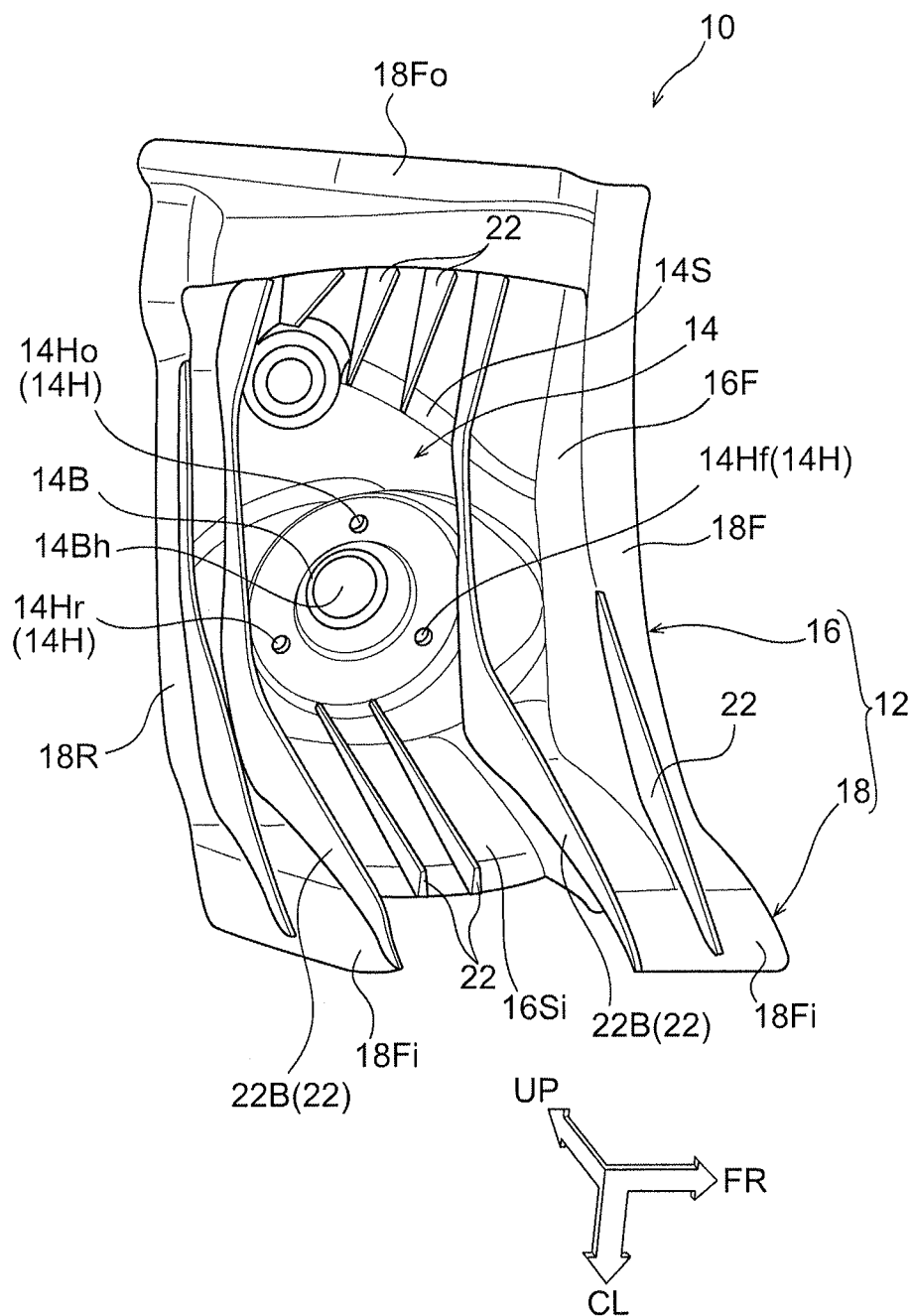
FIG. 2 is a perspective view in which the schematic structure of the suspension tower relating to the present embodiment is viewed obliquely from the rear and from beneath.

The schematic structure of the suspension tower 10 is shown in FIG. 1 in a perspective view seen obliquely from the front and from above. Further, the schematic structure of the suspension tower 10 is shown in FIG. 2 in a perspective view seen obliquely from the rear and from below. As shown in these drawings, the suspension tower 10 is structured to include a tower main body 12, and a top plate 14 that serves as an example of the plate in the present disclosure.

The top plate 14 is formed in the shape of a rectangular plate that is long in the vehicle transverse direction as seen in plan view, and structures the upper end portion of the suspension tower 10. As described later, a front suspension, that serves as an example of the upper end side of a suspension that structures the automobile to which the suspension tower 10 is applied, is fixed to the top plate 14. On the other hand, the tower main body 12 has a peripheral wall 16 at which the peripheral edge portion of the top plate 14 hangs downward, and is structured so as to accommodate the aforementioned front suspension.

Concretely, the peripheral wall 16 that is a standing wall is structured to include a front wall 16F, a rear wall 16R, an inner side wall 16Si, and an outer side wall 16So. The front wall 16F and the rear wall 16R face one another in the longitudinal direction, and the both ends in the vehicle transverse direction are connected by the inner side wall 16Si and the outer side wall 16So that face one another in the vehicle transverse direction. Further, the tower main body 12 has a flange portion 18 that juts-out from the lower edge of the peripheral wall 16.

The flange portion 18 includes a front flange 18F that juts-out toward the front from the front wall 16F, a rear flange 18R that juts-out toward the rear from the rear wall 16R, inner flanges 18Fi that jut-out downward from the inner side wall 16Si, and an outer flange 18Fo that juts-out outwardly in the vehicle transverse direction from the outer side wall 16So.

The front flange 18F and the rear flange 18R are joined by welding or the like to portions that structure a wheel house at an unillustrated fender apron. The inner flanges 18Fi are joined by welding or the like to an unillustrated front side member. In this embodiment, the inner flanges 18Fi are provided as a pair that are apart to the front and the rear. The outer flange 18Fo is joined by welding or the like to an unillustrated apron upper member.

The suspension tower 10 in this embodiment is formed integrally on the whole by casting of a light metal material such as, for example, aluminum or an aluminum alloy or the like.

(Top Plate)

As shown in FIG. 1, plural (three in this embodiment) bolt holes 14H are formed in the top plate 14. The bolt holes 14H, that respectively serve as examples of fastening holes, are disposed apart from one another in the peripheral direction on an imaginary circular arc whose center is a stroke axis SA that forms the axis of (a shock absorber that structures) the front suspension.

More concretely, the three bolt holes 14H are disposed so as to form the vertices of an equilateral triangle as seen in plan view, with two of the bolt holes 14H being lined-up front and rear at the vehicle transverse direction inner side end portion of the top plate 14 and one of the bolt holes 14H being at the vehicle transverse direction outer side portion. When differentiating among these three bolt holes 14H, the bolt hole 14H that is positioned furthest toward the vehicle transverse direction outer side is called bolt hole Ho, the bolt hole 14H that is positioned furthest toward the front side is called bolt hole 14Hf, and the bolt hole 14H that is positioned furthest toward the rear side is called bolt hole 14Hr.

Figure 3:
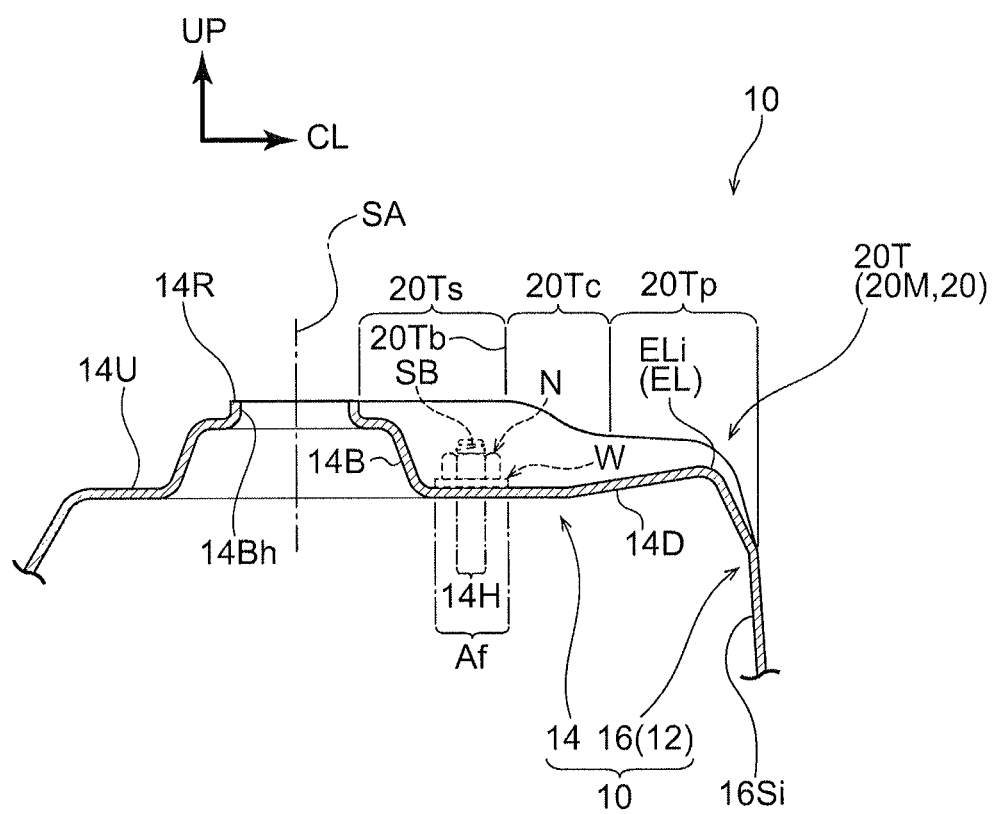
FIG. 3 is a cross-sectional view along line 3-3 of FIG. 1.

Nuts N (see FIG. 3) are screwed-together with stud bolts SB (bolts that are provided at the unillustrated front suspension, and are examples of the suspension in the present disclosure, see FIG. 3) that are passed-through these three bolt holes 14H. This is a structure in which the upper end side of the front suspension is fixed to the top plate 14, i.e., the suspension tower 10, by the fastening structures formed by the stud bolts SB and the nuts N. Note that, as described later, washers W (see FIG. 3) that are examples of fasteners are interposed between the nuts N and the top plate 14.

The portions (examples of portions around the bolt holes 14H) of the top plate 14, to which fastening load is applied by the aforementioned fastening structures, correspond to the fixing portions of the present disclosure. As described above, because the bolt holes 14H are disposed so as to be apart from the stroke axis SA that serves as an example of the axis of the suspension, the fixing portions as well are disposed so as to be apart from the stroke axis SA.

Further, plural step portions 14S are formed in the top plate 14, and the bending rigidity is increased as compared with a structure in which the step portions 14S are not formed. Moreover, a boss portion 14B, that is cylindrical and projects-out upward and whose central axis is the stroke axis SA, and plural ribs 20, that are disposed so as to form a radial form that is centered around the stroke axis SA as seen in plan view, are formed at the top plate 14. The respective ribs 20 project-out upward of the top plate 14, and extend from the stroke axis SA side toward the outer peripheral side of the top plate 14.

The center of the boss portion 14B is made to be a through-hole 14Bh, and an annular rib 14R is formed at the peripheral edge of this through-hole 14Bh. The proximal ends (examples of end portions at the stroke axis SA side) of the plural ribs 20 are respectively connected to the outer peripheral surface of the boss portion 14B and to the annular rib 14R. Portions of the proximal end sides of the respective ribs 20 are made to be a projecting height (a projecting height from a reference surface that is described later) that is the same as the annual rib 14R, and the heights are gradually decreased further toward the distal end sides than the fastening regions (examples of the fixing portions) of the front suspension.

Further, there are cases in which, among the plural ribs 20, the ribs 20 that are positioned so as to sandwich the bolt holes 14H in the peripheral direction are called main ribs 20M, and the ribs 20 other than the main ribs 20M are called auxiliary ribs 20S. In this embodiment, the total of six main ribs 20M that sandwich the three bolt holes 14H therebetween in the peripheral direction, and the total of six auxiliary ribs 20S, two of each of which are disposed between the main ribs 20M with respect to the bolt holes 14H that are adjacent to one another in the peripheral direction, are formed, such that there is a total number of 12 of the ribs 20.

The structures of these ribs 20 are described in detail as a main structure.

(Inner Ribs)

As shown in FIG. 2, plural inner ribs 22 that extend along the vehicle transverse direction as seen in bottom view are formed at the inner portion of the suspension tower 10. The plural inner ribs 22 span over the top plate 14 and at least one of the inner side wall 16Si and the outer side wall 16So, and project-out inwardly (downward). There are cases in which, among these plural inner ribs 22, the pair of front and rear inner ribs 22 that go from the inner side wall 16Si via the top plate 14 and reach the outer side wall 16So are called bridging ribs 22B. The bridging ribs 22B correspond to the inner ribs of the present disclosure, and the inner side wall Si and the outer side wall 16So that are bridged by these bridging ribs 22B correspond to the facing walls in the present disclosure.

In this embodiment, the pair of bridging ribs 22B are structured to function as arm supporting portions that support an upper arm, that structures the above-described front suspension, such that the upper arm can swing vertically.

[Main Structures]

Due to contrivances such as the dimensions, the shapes, the arrangement and the like of the plural ribs 20, the above-described suspension tower 10 is increased rigidity with respect to input from the front wheel that the front suspension supports, as compared with a structure that does not have such contrivances. The contrivances such as the dimensions, the shapes, the arrangement, and the like of the plural ribs 20 are concretely described hereinafter.

(Relationship between Ribs and Ridgelines)

As shown in FIG. 1, the distal ends (the end portions that are far from the stroke axis SA) or the intermediate portions of some of the ribs 20 among the plural ribs 20 are positioned on ridgelines EL of the top plate 14 and the tower main body 12. Note that there are cases in which, among the ridgelines EL, the ridgeline of the top plate 14 and the front wall 16F is called front ridgeline ELf, the ridgeline of the top plate 14 and the rear wall 16R is called rear ridgeline ELr, and the ridgeline of the top plate 14 and the inner side wall 16Si is called inner ridgeline ELi. Although not illustrated, the respective ridgelines EL are round shaped.

In this embodiment, the distal ends or the intermediate portions of all of the ribs 20, except for the two main ribs 20M that sandwich the bolt hole 14Ho that is positioned at the vehicle transverse direction outer side, are positioned on the ridgelines EL. Concretely, the respective distal ends of the main rib 20M at the vehicle transverse direction outer side with respect to the bolt hole 14Hf that is positioned at the vehicle transverse direction inner side and the front side, and the two auxiliary ribs 20S that are positioned further toward the vehicle transverse direction outer side than this main rib 20M, are positioned on the front ridgeline ELf.

Further, the respective distal ends of the main rib 20M at the vehicle transverse direction outer side with respect to the bolt hole 14Hr that is positioned at the vehicle transverse direction inner side and the rear side, and the two auxiliary ribs 20S that are positioned further toward the vehicle transverse direction outer side than this main rib 20M, are positioned on the rear ridgeline ELr.

On the other hand, among the main ribs 20M with respect to the two bolt holes 14Hf, 14Hr that are positioned at the vehicle transverse direction inner side, the respective intermediate portions of the two main ribs 20M that are positioned between these bolt holes 14Hf, 14Hr are positioned on the inner side wall 16Si. Moreover, the respective intermediate portions of the two auxiliary ribs 20S that are positioned between the bolt holes 14Hf, 14Hr also are positioned on the inner side wall 16Si. Namely, these four ribs 20 pass the inner ridgeline ELi and extend to as far as the inner side wall 16Si, and the respective intermediate portions thereof are positioned on the inner ridgeline ELi.

Figure 4:
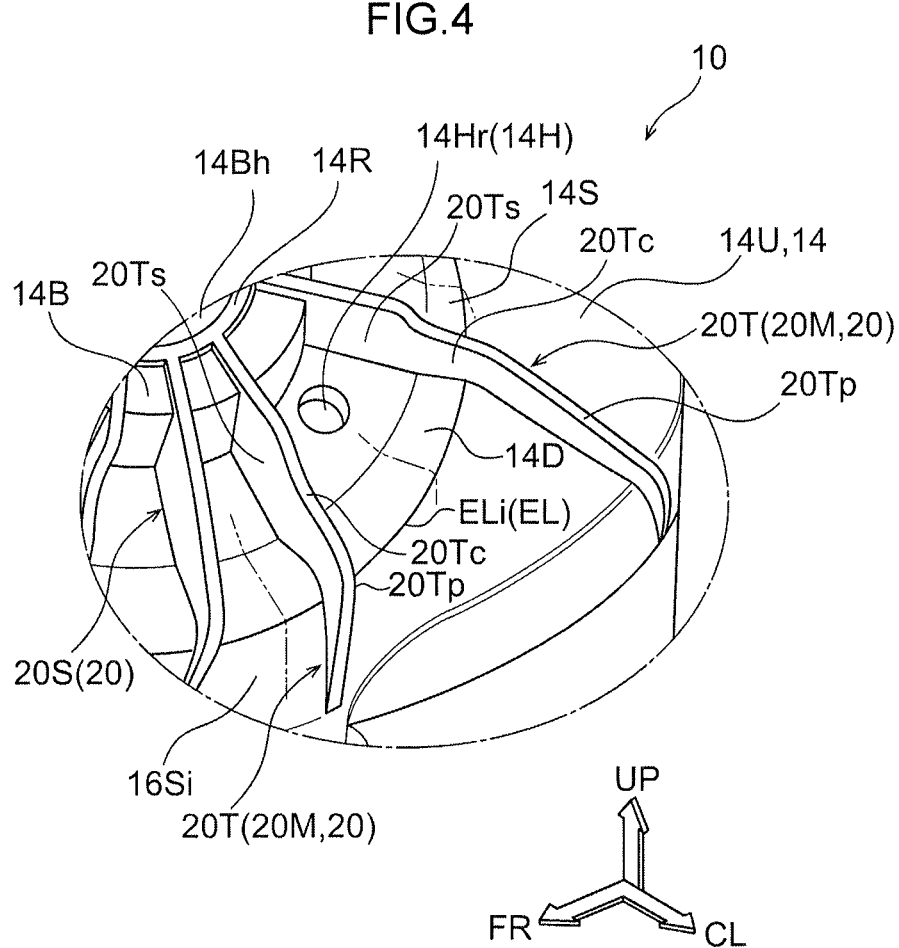
FIG. 4 is a perspective view showing, in an enlarged manner, gradually changing ribs that structure the suspension tower relating to the present embodiment.

Here, to further explain the inner ridgeline ELi, as shown in FIG. 3, an inclined portion 14D, that is inclined gently upward, is formed at the vehicle transverse direction inner side (the inner ridgeline ELi side) of the flat plate portion in which the bolt holes 14Hf, 14Hr are formed at the top plate 14. The line that connects, in the longitudinal direction (the peripheral direction), the boundary between the vehicle transverse direction inner end of this inclined portion 14D and upper end of the inner side wall 16Si is made to be the inner ridgeline ELi. Note that, as shown in FIG. 4, the inclined portion 14D circles-around also at the front and rear edge portion sides of the top plate 14, and the above-described step portions 14S are formed at these portions.

As described above, the ribs 20, whose distal ends are positioned on the ridgelines EL have increased rigidity with respect to bending in the vertical direction, as compared with ribs whose distal ends or intermediate portions do not reach the ridgelines EL. The bending rigidity of the top plate 14 is improved due to these ribs 20. Further, the rigidity of the suspension tower 10 with respect to bending in the falling direction of the peripheral wall 16 is improved due to these ribs 20. These effects of improving rigidity are described later together with the operation of the present embodiment.

(Relationship Between Ribs and Inner Ribs)

On the other hand, the distal ends of the two main ribs 20M that sandwich the bolt hole 14Ho at the vehicle transverse direction outer side are positioned on the top plate 14 as shown in FIG. 1. In this embodiment, the distal ends of the two main ribs 20M that sandwich the bolt hole Ho are positioned on the respectively different bridging ribs 22B. In other words, the distal end portions of the two main ribs 20M that sandwich the bolt hole 14Ho coincide with positions at which the bridging ribs 22B are provided upright at the reverse surface of the top plate 14.

The main ribs 20M, whose distal ends are positioned on the bridging ribs 22B in this way, have increased rigidity with respect to bending in the vertical direction, as compared with ribs whose distal ends are positioned on the top plate 14 and do not reach the bridging ribs 22B. This effect of improving the rigidity is described later together with the operation of the present embodiment.

Further, in this embodiment, the distal ends of the two main ribs 20M that sandwich the bolt hole 14Ho are positioned also on the step portion 14S. In other words, the distal ends of the two main ribs 20M that sandwich the bolt hole 14Ho are positioned on the intersecting portions of the bridging ribs 22B and the step portion 14S at the top plate 14.

(Rib Shapes)

At least some of the main ribs 20M among the above-described plural main ribs 20 are made to be gradually changing ribs 20T having gradually changing portions 20Tc whose heights (vertical positions) from a reference surface that is described later gradually change from the proximal end side toward the distal end side. In this embodiment, as shown in FIG. 4, the two main ribs 20M that sandwich, in the peripheral direction, the bolt hole 14Hr that is positioned at the vehicle transverse direction inner side and the rear side, are made to be the gradually changing ribs 20T. Concrete description is given hereinafter.

As shown in FIG. 3, the height of the rib 20 is determined with a top surface 14U, that runs along a plane orthogonal to the stroke axis SA at the top plate 14, i.e., the fastening surface of the front suspension, being the reference surface. Accordingly, the top surface of the inclined portion 14D is not used as a reference for the height of the ribs 20.

The gradually changing rib 20T is structured to include a constant level portion 20Ts whose height from the reference surface is constant, and the gradually changing portion 20Tc. The constant level portion 20Ts is disposed at the proximal end side, i.e., the boss portion 14B side, of the rib 20. The gradually changing portion 20Tc is disposed continuously with the distal end side of the constant level portion 20Ts. The height of the gradually changing portion 20Tc is, at the proximal end, made to be the same as the height of the constant level portion 20Ts, and gradually becomes lower toward the distal end side.

Note that, at the gradually changing portion 20Tc, the relationship between height Y from the reference surface and position X in the length direction is prescribed by a high-order function. Note that the relationship between the height Y and the position X may be prescribed by an irrational function ($Y=X^{1/2}$).

In this embodiment, the gradually changing rib 20T has a distal end side portion 20Tp that is continuous with the distal end side of the gradually changing portion 20Tc. The distal end side portion 20Tp is, at the proximal end, the same as the height of the distal end side at the gradually changing portion 20Tc, and, from this proximal end or a portion that is apart from the proximal end, passes the inner ridgeline ELi while the height thereof is gradually decreased.

Figure 5A:
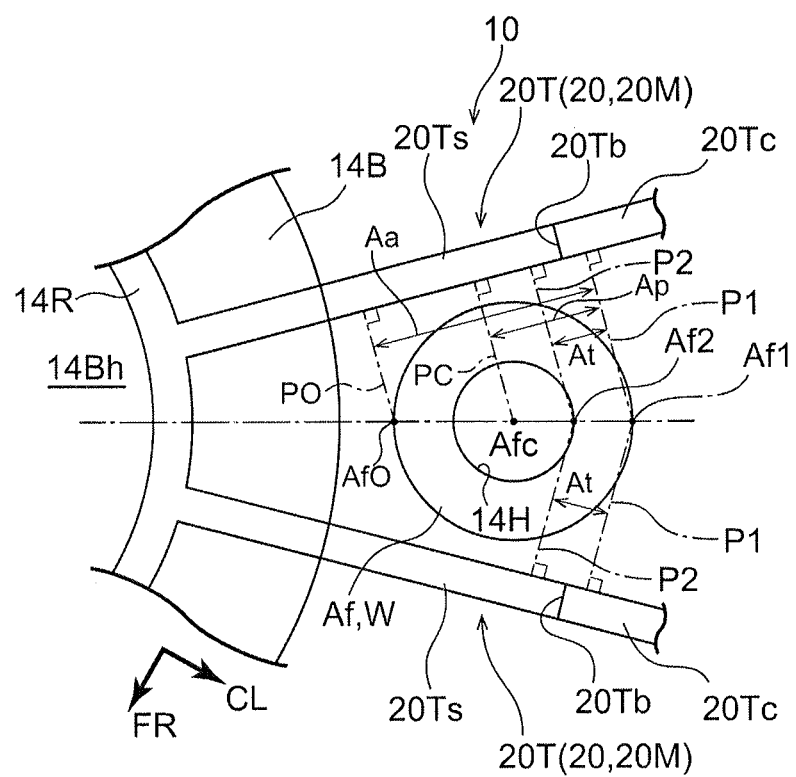
FIG. 5A is a drawing for explaining the gradually changing rib that structures the suspension tower relating to the present embodiment, and is a plan view showing a boundary position between a constant level portion and a gradually changing portion.
Figure 5B:
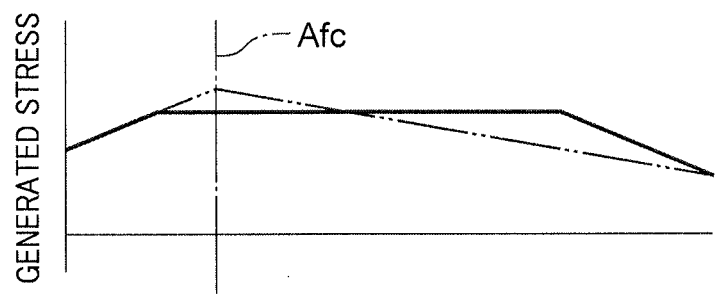
FIG. 5B is a drawing for explaining the gradually changing rib that structures the suspension tower relating to the present embodiment, and is a graph showing generated stress.

Here, a boundary 20Tb between the constant level portion 20Ts and the gradually changing portion 20Tc, i.e., the position (starting point) of the proximal end of the gradually changing portion 20Tc, is described. A range Aa that is permissible as the setting range of the boundary 20Tb is made to be a range that is adjacent to the fixing portion of the front suspension at the top plate 14, i.e., application range Af of the fastening load (see FIG. 3, FIG. 5A). As shown in FIG. 5A, the limit, at the side near the stroke axis SA, of this range Aa is made to be the position, at the gradually changing rib 20T, which position is intersected by perpendicular line P0 that is drawn from the stroke axis SA side end portion Af0 of the application range Af of the fastening load (the washer W) (i.e., is made to be the position that is the shortest distance from the end portion Af0). Further, the limit, at the side far from the stroke axis SA, is made to be the position, at the gradually changing rib 20T, which position is intersected by perpendicular line P1 that is drawn from end portion Af1, that is at the side far from the stroke axis SA, of the application range Af of the fastening load.

Moreover, range Ap, that is preferable as the setting range of the boundary 20Tb of the gradually changing rib 20T, is made to be a range that is within the above-described range Aa and is adjacent to the distal end side of a center Afc of the application range Af, within the application range Af of the fastening load. Namely, the limit, at the side near to the stroke axis SA, of this range is made to be a position that is intersected by a perpendicular line Pc that is drawn from the center Afc of the application range Af. Note that, in FIG. 5A, the ranges Aa and Ap are illustrated only at the one (at the upper side in the drawing) gradually changing rib 20T side, but the same holds for the other gradually changing rib 20T as well.

Further, in this embodiment, a more preferable setting range At is set as the setting range of the boundary 20Tb of the gradually changing rib 20T. This setting range At is made to be a range that is within the above-described range Aa and is adjacent to the distal end side of the bolt hole 14H, within the application range Af of the fastening load. Namely, the limit, at the side near to the stroke axis SA, of this range is made to be a position that is intersected by a perpendicular line P2 that is drawn from a position Aft of the edge portion, that corresponds to the distal end at the side far from the stroke axis SA, of the bolt hole 14H in the application range Af.

In other words, as shown in FIG. 5A, the boundary 20Tb is disposed between the position at the gradually changing rib 20T which position is intersected by the above-described perpendicular line P1, and the position at that gradually changing rib 20T which position is intersected by the above-described perpendicular line P2. Accordingly, the boundary 20Tb is disposed between the position at the gradually changing rib 20T which position is the shortest distance from the distal end side end portion (aforementioned position Aft) of the bolt hole 14H, and the position at the gradually changing rib 20T which position is the shortest distance from the distal side end portion Af1 of the application range Af of the fastening load.

The significance of the shape of this gradually changing rib 20T is described hereinafter together with the operation of the present embodiment.

[Operation]

Operation of the embodiment is described next.

Load from the front wheel, that accompanies traveling of the vehicle and the like, is inputted to the suspension tower 10 via the front suspension. As shown schematically in FIG. 6A, with respect to load Fv in the vertical direction, the top plate 14 is deformed in a direction of bending vertically (refer to the imaginary lines in FIG. 6A). The reaction force at this time is, via the tower main body 12 that includes the peripheral wall 16, transmitted to and supported by the skeleton members such as the front side member, the apron upper member, and the like.

On the other hand, with respect to load Fh in the longitudinal direction or the vehicle transverse direction, as shown schematically in FIG. 6B, the suspension tower 10 is deformed in the direction in which the peripheral wall 16 (the front wall 16F, the rear wall 16R, the outer side wall 16So or the inner side wall 16Si) falls (refer to arrow A in FIG. 6B). The reaction force at this time is, via the tower main body 12 that includes the peripheral wall 16, transmitted to and supported by the skeleton members such as the front side member, the apron upper member, and the like.

In the present embodiment, the suspension tower 10 has the plural ribs 20 that are provided upright in a radial form from the top plate 14. Therefore, at the suspension tower 10, deformation due to load from the front wheel that is inputted via the front suspension is suppressed. Namely, the rigidity, with respect to input load from the front wheel, of the suspension tower 10 is increased as compared with a comparative example that does not have the plural ribs 20.

(Effects of Improving Rigidity Due to Relationship Between Ribs and Ridgelines)

Here, at the suspension tower 10, the distal ends or intermediate portions of some of the ribs 20 among the plural ribs 20 are positioned on the ridgelines EL of the top plate 14 and the peripheral wall 16. In particular, in the present embodiment, the distal ends or intermediate portions of all of the ribs 20, except for the two main ribs 20M that are disposed so as to sandwich the bolt hole 14Ho that is positioned at the vehicle transverse direction outer side, are positioned on the ridgelines EL. Therefore, the effect of improving the rigidity of the suspension tower 10 by the ribs 20 is great.

Concretely, the ribs 20 bridge the boss portion 14B and the peripheral wall 16 (members that transmit reaction force to the skeleton members as described above), i.e., the ridgelines EL, at which the rigidity with respect to bending in the vertical direction is high. Accordingly, the rigidity of the ribs 20 with respect to bending in the vertical direction is high, as compared with a comparative example in which the proximal ends and distal ends are positioned on the flat plate portion of the top plate 14. Therefore, the rigidity of the top plate 14, at which these ribs 20 are provided upright, with respect to bending in the vertical direction is high as compared with the aforementioned comparative example, and deformation with respect to load Fv in the vertical direction from the front wheel is suppressed.

Further, with regard to deformation (see arrow A of FIG. 6B) in the direction in which the peripheral wall 16 falls due to load Fh in the longitudinal direction or the vehicle transverse direction, tensile or compressive (axial force) load is transmitted to the ribs 20 that reach to as far as the peripheral wall 16 at the distal ends or the intermediate portions. The peripheral wall 16 deforming in the falling direction is suppressed due to the load generation (reaction force supporting) of these ribs 20, or in other words, by using the rigidity of the ribs 20.

(Effects of Improving Rigidity Due to Relationship Between Ribs and Inner Ribs)

Moreover, at the suspension tower 10, the positions of the respective distal ends of the two main ribs 20M, whose distal ends do not reach the ridgelines EL as described above, coincide with the set positions of the bridging ribs 22B at the top plate 14. In other words, the ribs 20 bridge the boss portion 14B and the bridging ribs 22B (members that transmit reaction force to the skeleton members as described above) at which the rigidity with respect to bending in the vertical direction is high. Accordingly, the rigidity of the above-described two main ribs 20 improves due to a mechanism that is similar to the rigidity improving mechanism of the ribs 20 (the top plate 14) due to the distal ends or the intermediate portions being positioned on the ridgelines EL.

Due thereto, the two main ribs 20M, that sandwich the bolt hole 14Ho at the vehicle transverse direction outer side, also contribute to suppressing the bending deformation of the top plate 14 with respect to load in the vertical direction from the front wheel, and to suppressing falling deformation of the peripheral wall 16 with respect to load in the longitudinal direction or the vehicle transverse direction from the front wheel.

In particular, because the distal ends of the two main ribs 20M, that sandwich the bolt hole 14110 at the vehicle transverse direction outer side, are positioned on the step portion 14S, the rigidity with respect to input from the front wheel improves more. For this reason as well, these two main ribs 20M contribute to suppressing the bending deformation of the top plate 14 with respect to the load Fv in the vertical direction from the front wheel, and to suppressing falling deformation of the peripheral wall 16 with respect to the load Fh in the longitudinal direction or the vehicle transverse direction from the front wheel.

(Effects of Improving Rigidity Due to Gradually Changing Ribs)

Further, at the suspension tower 10, at least some of the main ribs 20M are made to be the gradually changing ribs 20T. The effects of improving rigidity due to these gradually changing ribs 20T are described in comparison with ribs 100 relating to a comparative example.

Figure 5C:
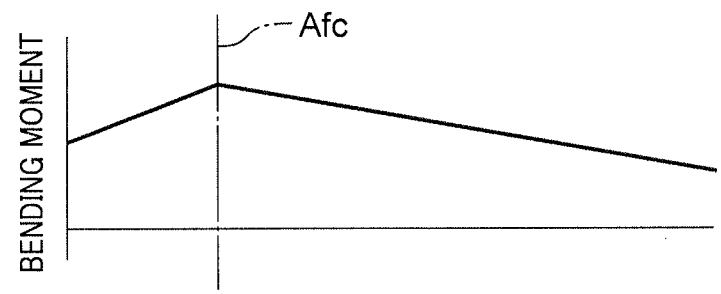
FIG. 5C is a drawing for explaining the gradually changing rib that structures the suspension tower relating to the present embodiment, and is a graph showing bending moment.
Figure 5D:
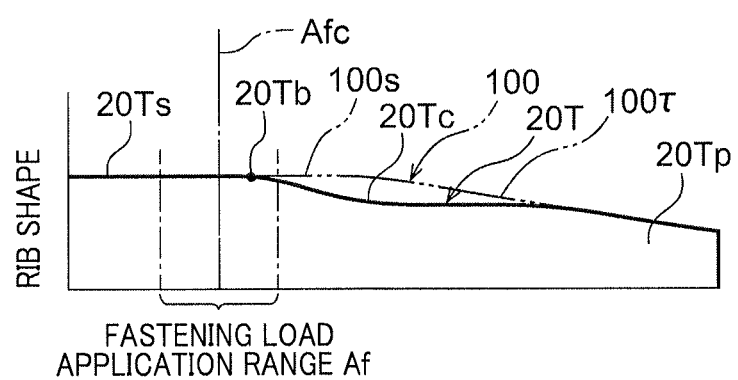
FIG. 5D is a drawing for explaining the gradually changing rib that structures the suspension tower relating to the present embodiment, and is a schematic drawing showing the schematic shape of the gradually changing rib.

As shown by the imaginary line in FIG. 5D, the rib 100 has a constant level portion 100s that goes past the application range of the fastening load and reaches the distal end side, and a tapered portion 100t that is continuous with the distal end side of the constant level portion 100s and whose height is gradually decreased. When upwardly-directed load is inputted to the application range Af of the fastening load (the fixing portion), as shown in FIG. 5C, the bending moment becomes a peak (maximum) at the center Afc (the load input point) of the application range Af of the fastening load (the illustrated example is an example in which concentrated load is inputted to the center Afc of the application range AO. The stress that is generated at the rib 100 due to this bending moment becomes a peak at the center Afc (the load input point) of the application range Af of the fastening load, as shown by the imaginary line in FIG. 5B. In this comparative example, in a case in which the peak of the stress exceeds a permissible value, the stress can be kept to within a permissible range by, for example, increasing the height of the constant level portion 100s of the rib 100. However, there are cases in which the height of the rib 100 is constrained due to requirements such as the design of the engine hood that is positioned above the suspension tower, avoiding of interference between other parts or wires or the like within the engine compartment, and the like.

In contrast, at the gradually changing rib 20T, the boundary Tb (the proximal end of the gradually changing portion 20Tc) between the constant level portion 20Ts and the gradually changing portion 20Tc is disposed adjacent to the application range Af of the fastening load. Therefore, with respect to input of load from the front wheel that goes via the front suspension, the stress that is generated at the gradually changing rib 20T is mitigated. In particular, in this embodiment, the boundary Tb between the constant level portion 20Ts and the gradually changing portion 20Tc is disposed within the setting range Af of the fastening load, and within the setting range At that is further toward the distal end side than the center Afc. Therefore, as shown by the solid line in FIG. 5B, with regard to the stress, that is generated at the gradually changing rib 20T by the bending moment that becomes a peak at the center Afc (the load input point) of the application range Af of the fastening load, the range in which the peak arises broadens, but on the other hand, the peak value is kept small as compared with the above-described rib 100. Namely, the peak of the generated stress can be kept down without relying on increasing the height of the rib 20. Due thereto, the desired rigidity (improving effects) can be obtained without being affected by the above-described various types of constraints that are due to increasing the height of the rib 20.

In this way, in the suspension tower 10 relating to the present embodiment, rigidity with respect to input load from the front wheel can be improved, while an increase in the mass of or an increase in the dimensions of the ribs is suppressed. Due thereto, the suspension tower 10 effectively contributes to an improvement in the handling stability of the automobile to which it is applied, and in particular, the handling stability at the time of high-speed traveling.

Modified Examples

Note that the above-described embodiment illustrates an example in which the distal end positions of the two main ribs 20M, that sandwich the bolt hole 14Ho at the vehicle transverse direction outer side, are positioned on the bridging ribs 22B, but the present disclosure is not limited to this. For example, there may be a structure that is provided with the ribs 20 whose length direction intermediate portions are positioned on the bridging ribs 22B.

Further, the above-described embodiment illustrates an example in which the distal ends or the intermediate portions of all of the ribs 20 reach the ridgelines EL or the bridging ribs 22B, but the present disclosure is not limited to this. It suffices to, in accordance with the required rigidity and strength, set the number of, the proportion of, the arrangement of, and the like of the ribs 20 whose distal ends or intermediate portions reach the ridgelines EL or the bridging ribs 22B. Note that, in a structure that has the gradually changing ribs 20T, there may be a structure that does not have the ribs 20 whose distal ends or intermediate portions reach the ridgelines EL or the bridging ribs 22B.

Moreover, the above-described embodiment illustrates an example in which some of the ribs 20 are the gradually changing ribs 20T, but the present disclosure is not limited to this. For example, all of the ribs 20 may be made to be the gradually changing ribs 20T, or only all of the main ribs 20M may be made to be the gradually changing ribs 20T, or the ribs 20 that sandwich a specific bolt hole 14H may be made to be the gradually changing ribs 20T. Further, for example, the ribs 20, that are disposed at one side of a specific bolt hole 14H or all of the bolt holes 14H, may be made to be the gradually changing ribs 20T.

Still further, the above-described embodiment illustrates an example in which the top surface of the gradually changing portion 20Tc is a curved surface (the shape as seen in side view is prescribed by a high-order or an irrational function), but the present disclosure is not limited to this. It suffices for, at the gradually changing rib 20T, the proximal end of the gradually changing portion 20Tc to be adjacent to the fixing portion (the application range Af of the fastening load), and, for example, the gradually changing portion 20Tc may be formed in a rectilinear shape as seen in side view. Further, there may be a structure in which the gradually changing rib 20T does not have the distal end side portion 20Tp. Note that, in a structure that has the ribs 20 whose distal ends or intermediate portions reach the bridging ribs 22B, there may be a structure that does not have the gradually changing ribs 20T.

Further, the above-described embodiment illustrates an example in which the ranges Aa, Ap, At, in which the boundary 20Tb of the gradually changing rib 20T is set, are determined on the basis of the shortest distances (positions intersected by perpendicular lines) at the gradually changing rib 20T from respective portions of the application range Af of the fastening load, but the present disclosure is not limited to this. For example, points at which circular arcs, whose centers are the stroke axis SA and that pass through the positions (end portions) Af0, Af1, Afc, Aft, intersect the gradually changing rib 20T may be made to be the limits of the setting ranges Aa, Ap, At of the boundary 20Tb.

In addition, it goes without saying that the present disclosure can be embodied by being changed in various ways within a scope that does not depart from the gist thereof.

Further, the disclosure of Japanese Patent Application No. 2014-024387 filed on Feb. 12, 2014 is, in its entirety, incorporated by reference into the present specification.

Relationships of correspondence between the reference numerals and the names of the respective portions that are used in the present specification are given hereinafter.
10 suspension tower
12 tower main body
14 top plate (example of plate)
14H, 14Hf, 14Ho, 14Hr bolt hole (fastening hole)
16 peripheral wall
16F front wall
16R rear wall
16Si inner side wall (example of facing wall)
16So outer side wall (example of facing wall)
20 rib
20T gradually changing rib
20Ts constant level portion
20Tc gradually changing portion
20Tb boundary
22B bridging rib (example of inner side rib)
Af application range of fastening load (example of fixing portion)
EL ridgelines
ELf front ridgeline (example of ridgeline)
ELi inner ridgeline (example of ridgeline)
ELr rear ridgeline (example of ridgeline)
N nut (example of fixing portion)
SB stud bolt (example of suspension)
W washer (example of fixing portion, fastener)

The invention claimed is:

1. A suspension tower comprising:
a plate at which an upper end side of a suspension is fixed at a fixing portion that is disposed apart from an axis of the suspension; and
a gradually changing rib that is provided upright from the plate and extends from an axis side toward an outer peripheral side at the plate, and that includes a constant level portion whose height from the fixing portion is constant, and a gradually changing portion whose height from the fixing portion gradually decreases from the constant level portion toward the outer peripheral side, wherein a boundary between the constant level portion and the gradually changing portion is directly above a far side of the fixing portion with respect to an axis of the suspension, when viewed in a cross section taken along a plane including the axis of the suspension and intersecting the boundary, and when viewed from a perpendicular direction against the cross section.

2. The suspension tower of claim 1, wherein:
at the fixing portion, the upper end side of the suspension is fixed by a fastening load from a fastener, the fastening load being applied around a fastening hole formed in the plate; and
the boundary between the constant level portion and the gradually changing portion is disposed between a position, at the gradually changing rib, which is a shortest distance from an edge portion of the fastening hole, that is furthest toward an outer peripheral side of the fastening hole, and a position, at the gradually changing rib, which is a shortest distance from a portion of an application range of the fastening load, that is furthest toward an outer peripheral side of the application range of the fastening load.

3. The suspension tower of claim 1, wherein:
a plurality of ribs are provided upright at the plate in a radial form around the axis of the suspension; and
among the plurality of ribs, at least one of two ribs, that are disposed so as to sandwich the fixing portion in the peripheral direction, is the gradually changing rib.

4. The suspension tower of claim 3, comprising:
a tower main body that includes a peripheral wall to whose upper end the plate is fixed, and that accommodates the suspension within the peripheral wall; and
an inner rib that, within the peripheral wall, bridges facing walls that structure the peripheral wall,
wherein an end portion at a side far from the axis of the suspension, or an intermediate portion of at least some of the ribs, is positioned on the inner rib.

5. The suspension tower of claim 3, comprising:
a tower main body that has a peripheral wall to whose upper end the plate is fixed, and that accommodates the suspension within the peripheral wall,
wherein an end portion at a side far from the axis of the suspension, or an intermediate portion of at least some of the ribs, is positioned on a ridgeline of the plate and the peripheral wall.

6. The suspension tower of claim 5, wherein the end portion at the side far from the axis of some of the ribs is positioned on a ridgeline of the plate and, of the peripheral wall, a front wall or a rear wall that faces in a vehicle longitudinal direction.

7. A suspension tower comprising:
a plate at which an upper end side of a suspension is fixed at a fixing portion that is disposed apart from an axis of the suspension;
a gradually changing rib that is provided upright from the plate and extends from an axis side toward an outer peripheral side at the plate, and that includes a constant level portion whose height from the fixing portion is constant, and a gradually changing portion whose height from the fixing portion gradually decreases from the constant level portion toward the outer peripheral side, wherein a boundary between the constant level portion and the gradually changing portion is adjacent to the fixing portion,
a tower main body that includes a peripheral wall to whose upper end the plate is fixed, and that accommodates the suspension within the peripheral wall; and
an inner rib that, within the peripheral wall, bridges facing walls that structure the peripheral wall,
wherein
an end portion at a side far from the axis of the suspension, or an intermediate portion of at least some of the ribs, is positioned on the inner rib;
a plurality of ribs are provided upright at the plate in a radial form around the axis of the suspension; and
among the plurality of ribs, at least one of two ribs, that are disposed so as to sandwich the fixing portion in the peripheral direction, is the gradually changing rib.

* * * * *